United States Patent

[11] 3,630,686

| [72] | Inventors | Horst Rothert<br>Otternweg 15, Berlin 28;<br>Wolf Karasiak, Richterstrasse 17, Berlin 42, both of Germany |
|---|---|---|
| [21] | Appl. No. | 883,108 |
| [22] | Filed | Dec. 8, 1969 |
| [45] | Patented | Dec. 28, 1971 |
| [32] | Priority | June 7, 1967 |
| [33] | | Germany |
| [31] | | F 52625 |
| | | Original application June 4, 1968, Ser. No. 734,409, now abandoned. Divided and this application Dec. 8, 1969, Ser. No. 883,108 |

[54] APPARATUS FOR CONTINUOUSLY POLYCONDENSING AND POLYMERIZING MONOMERS
4 Claims, 2 Drawing Figs.

[52] U.S. Cl. .................................................. 23/283,
23/260, 23/285, 260/75 M, 260/95 R, 159/6 W,
159/17 R, 259/8, 259/107, 165/109
[51] Int. Cl. ...................................................... B01j 1/00,
C08f 1/98, C08q 17/04
[50] Field of Search........................................... 23/283,
285, 260; 259/8, 107; 260/75 M; 159/6 W, 17 P,
17 R

[56] References Cited
UNITED STATES PATENTS

| 3,054,776 | 9/1962 | Higgins.......................... | 23/285 X |
| 3,329,410 | 7/1967 | Rothert......................... | 259/107 |
| 3,446,772 | 5/1969 | Forster et al.................. | 260/75 M UX |
| 2,357,706 | 9/1944 | Topperwein .................. | 165/101 X |

OTHER REFERENCES

Chemical Engineering Magazine Article, " Thin–Film Evaporator Can Produce Dry Powders," pp. 52 and 54, Dec. 23, 1963

Primary Examiner—James H. Tayman, Jr.
Attorney—Spencer & Kaye

ABSTRACT: An apparatus for continuously polycondensing and polymerizing monomers and, in particular, bis(2-hydroxyethyl) terephthalate. The condensation polymerization is carried out in a reactor vessel having a top portion, a vertically oriented cylindrical side portion and a bottom portion and having rotatable vanes arranged inside the side portion for conveying downward a thin layer of the monomer located on the inside surface thereof. The top and bottom portions are provided with outlets for removing the released reaction products and the final products, respectively. The method of the present invention includes the step of heating the top portion, the side portion and the bottom portion of the vessel to different temperatures and the apparatus includes means for so heating.

PATENTED DEC 28 1971 3,630,686

INVENTORS.
Horst Rothert
Wolf Karasiak

BY Spencer & Kaye
ATTORNEYS.

APPARATUS FOR CONTINUOUSLY POLYCONDENSING AND POLYMERIZING MONOMERS

CROSS REFERENCE TO RELATED APPLICATION

This application is a division of copending application Ser. No. 734,409, filed June 4, 1968 and now abandoned.

BACKGROUND OF THE INVENTION

The present invention relates to an apparatus for continuously polycondensing or polymerizing monomers to form macromolecular products suitable for the manufacture of fibers. More particularly, the present invention relates to an apparatus for the continuous polycondensation of bis (2-hydroxyethyl) terephthalate in one or a plurality of stages by means of the thin layer technique.

As is known in the art, the esterification of terephthalic acid or the interesterification of dimethyl terephthalate with ethylene glycol produces bis (2-hydroxyethyl) terephthalate (also known as diglycol terephthalate). This product is present in a glycolic solution. The principal reaction is started and accelerated with the aid of catalysts which can then also be active in the subsequent polycondensation.

Because of the concentration of the initial products, the catalysts employed, the duration and the temperature of reactions of this type, oligomers will also be formed. ([1]) These oligomers are the subject of a detailed study by H. Zahn and R. Krzikalla: "Synthese von einheitlichen, linearen Oligoestern vom Poly-glykolterephthalate-Typ", "Die Makromolekulare Chemie," Vol, XXIII (1957) pp. 31–53. See also: a) Sidney D. Ross, E. Robert Coburn, William A. Leach, William B. Robinson: "Isolation of a cycle trimer from polyethylen-terephthalat-Film" in "Journal of a Polymer Science," Vol, XIII (1954) S. 406/07. b) J. Goodmann and B. F. Nesbitt: "The structure and reversible polymerization of cyclic oligomers from poly(ethylen terephthalates)" ibid., Vol. XLVIII p. 423/33.) During the esterification or interesterification at the conditions required for the condensation of bis (2-hydroxyethyl) terephthalate, in particular, there are formed a continuous series of oligo terephthalic acid glycol esters. In addition to these molecules which, as a result of their structure, form purely chainlike oligomers, still other oligomers are produced which cause certain difficulties in practice. All of these cyclic ethylene-terephthalate-oligomers remain in equilibrium with each other at the high temperature of the melt.

U.S. Pat. No. 3,329,410 describes reactor apparatus which employs the thin layer evaporation technique in the condensation polymerization of bis (2-hydroxyethyl) terephthalate. This apparatus includes a reactor vessel having vertically oriented cylindrical sides and having rotatable distributor vanes which spread the material in a thin layer on the inside walls of the cylinder and cause the layer to move downwards toward the bottom of the cylinder. The reactor vessel is also provided with a top portion, or dome, and means for drawing the released reaction products from this dome as well as a bottom portion, or sump, and means for releasing the final product of reaction from this sump.

During the operation of the reactor apparatus it has been found that fine oligomers crystals eventually develop by condensation or sublimation and form stalactitelike structures on the dome of the vessel. When these crystals attain a certain size they eventually fall of their own weight. Since their ability to adhere to the vessel walls is reduced as a result of the cracking of particles which come in contact therewith, these crystals fall as impurities all the way to the melt of the polycondensation product located in the vessel sump and reduce the quality of the threads which are ultimately formed from the product. In particular, the impurities impair the uniformity and degree of whiteness of the threads by adding a trace of yellow.

It can also be observed, in addition, that some of the deposits on the dome of the vessel which adhere for a particularly long time before falling eventually become black; they probably support a cracking and become carbonized. These products which are cracked in this way are not dissolved when they fall into the melt and eventually cause difficulties in the spinning processes.

SUMMARY OF THE INVENTION

An object of the present invention, therefore, is to develop a modified apparatus of the type described in the U.S. Pat. No. 3,329,410 which eliminates the difficulties caused by the formation of the crystal deposits described above.

This as well as other objects which will become apparent in the discussion that follows is achieved in a surprisingly simple manner by heating the individual sections of the reactor vessel to different ranges of temperature. It is possible to choose the temperatures such that deposits will no longer be formed on the dome of the reactor either by way of sublimation or condensation. The danger of impurities falling into the melt which is located in the polycondensed state in the sump of the reactor can thus be totally eliminated.

DESCRIPTION OF THE PREFERRED EMBODIMENT

Figure 1:
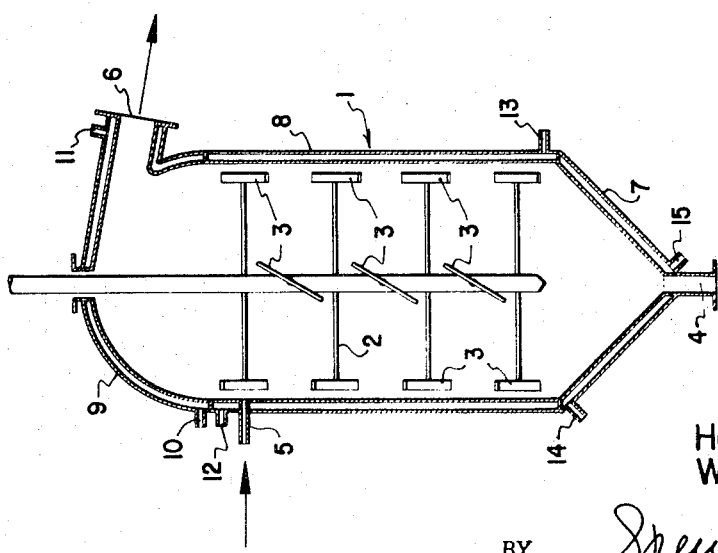
FIG. 1 is a schematic illustration, in elevation, of a single reactor vessel according to the present invention.

Referring now to the drawing, the FIG. 1 shows an individual reactor vessel of the type described in the U.S. Pat. No. 3,329,410 referred to above. The materials to be polycondensed are inserted into the vessel through the inlet 5 and spread into a thin film on the inside of the reactor 1 with the aid of the wiper blades 3. The wiper blades 3 are arranged on arms 2 in such a way that they convey the condensing material toward the bottom portion or sump of the reactor. The condensed product is removed through the outlet 4. The vapors which are liberated during the condensation are drawn from the reactor through the inclined vapor outlet pipe 6.

The reactor vessel is heated by passing a suitable liquid or gaseous heating medium through a double-walled vessel jacket. This jacket is divided into three separately heatable portions; namely, the top portion or dome 9, the central cylindrical portion 8 and the bottom portion or sump 7. The heating medium is continuously circulated through each of the three portions via the inlet and outlet pipes 10 and 11, 12 and 13 and 14 and 15, respectively.

In an industrial polycondensation plant a plurality of reactor vessels are normally employed to operate in serial stages. The first stage is usually constructed to serve only as a normal evaporator whereas the thin layer technique is employed in the subsequent ones.

Figure 2:
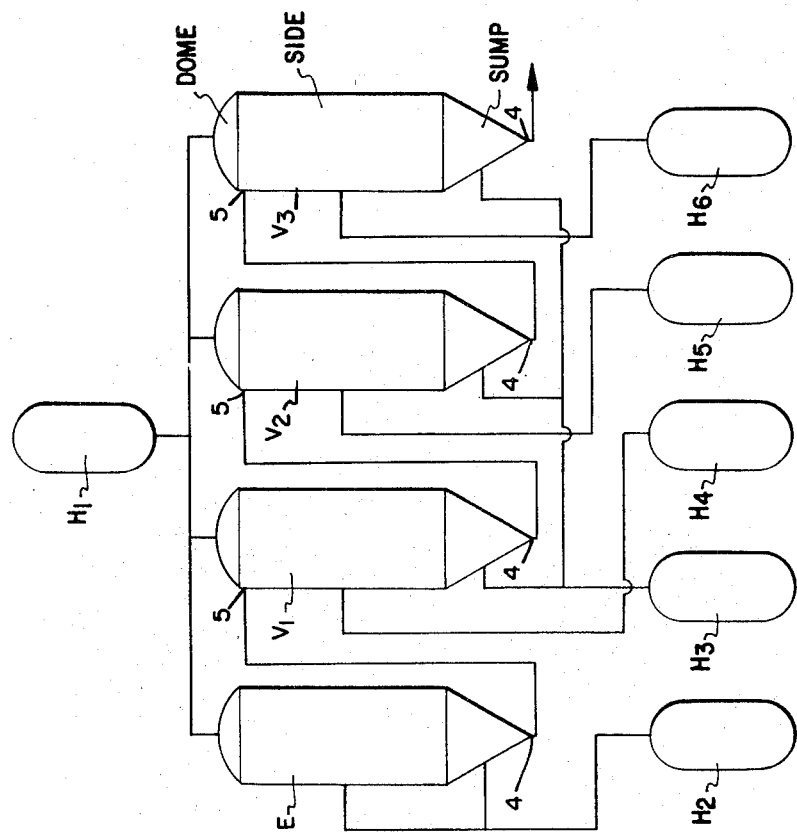
FIG. 2 is a schematic illustration of a series of reactor stages which are heated according to a preferred embodiment of the present invention.

With a plant of this type employing four reactors as shown in FIG. 2 a heating system is provided which has six heat circulation units operating at the temperatures set forth in the following table:

TABLE I

| Heat Circulation Unit | Operating Range |
| --- | --- |
| $H_1$ | 280°–350°C. |
| $H_2$ | 240°–270°C. |
| $H_3$ | 260°–320° C. |
| $H_4$ | 260°–320° C. |
| $H_5$ | 260°–320° C. |
| $H_6$ | 260°–320° C. |

It is recommended, in this case, that the sump or bottom portion of the three thin film reactors $V_1$, $V_2$, and $V_3$ be supplied from the heat circulation unit $H_3$ which is preferably maintained at 270° C. The inlet pipes 14 and the outlet pipes 15 of these vessels are thus connected together and to the heating unit to continuously recycle the fluid-heating medium.

The reactor vessel E which forms the first stage is normally constructed without the wiper blades since the prepolymers are not yet suited to the treatment in the thin layer reactor. The central and bottom portions of this first stage reactor may be fed from the heat circulation unit $H_2$, sect to operate at a temperature of 260°.

The cylindrical portions of the three thin layer reactors are connected to the heat circulation units $H_4$, $H_5$ and $H_6$ which operate in the range of 260°–320° C. These units may be advantageously adjusted so that each subsequent reactor is heated to a temperature 5° higher than the previous one starting with a cylinder temperature of the first thin layer reactor $V_2$ of 275° C.

Finally, the domes or top portions of all four reactors may be connected to be heated by the circulation unit $H_1$. This circulation unit may be adjusted in practice to operate at a temperature of 320° C.

Example of Operation

A homogeneous mixture is produced from a pure terephthalic acid suitable for direct esterification, and ethylene glycol in a mole ratio of 1:1.8. Calcium acetate is employed as an esterification catalyst at a quantity of 0.01 percent taken in relation to the initial quantity of terephthalic acid. The water which is produced as well as the ethylene glycol which likewise issues from the mixture are separated by means of a tower and the water is removed.

The terephthalic acid ethylene glycol mixture is then continuously agitated for 6 hours in an autoclave at 2 atmospheres above atmospheric pressure and a temperature of 230° C. and totally esterified. The glycol terephthalate obtained is characterized by the following:

free terephthalic acid, 3.5 percent
glycol ether, 2.3 percent

The glycol ether terephthalate is then fed into the polycondensing apparatus according to the present invention and treated therein under the following conditions:

| | |
|---|---|
| Absolute pressure: | 2 mm. Hg |
| Temperature of the compound: | 265° C. |
| Linear velocity of the vanes: | 0.2 m. per second |
| Thickness of the layer per average: | 1.5 mm. |
| Period of time of passage through the vessel: | about 15 minutes |

The polycondensed product is finally discharged from the opening 4 of the reactor vessel.

It will be understood that the above description of the present invention is susceptible to various modifications, changes, and adaptations, and the same are intended to be comprehended within the meaning and range of equivalents of the appended claims.

We claim:

1. Reactor apparatus for continuously polycondensing bis (2-hydroxyethyl)-terephthalate, comprising in combination:
   a. a plurality of reactor vessels arranged in series, each vessel having:
      1. a top portion, a vertically oriented cylindrical side portion and a bottom portion, and rotatable distributor vanes inside said side portion for conveying downward a thin layer of bis (2-hydroxyethyl)-terephthalate located on the inside surface of the side portion;
      2. inlet means arranged in said side portion through which bis (2-hydroxyethyl)-terephthalate is admitted to the vessel;
      3. a vapor outlet arranged in said top portion for removing vapor products from the vessel;
      4. outlet means arranged in said bottom portion for removing the final products from the vessel; and
      5. means for heating separately said top portion, said side portion and said bottom portion of the vessel to different temperatures
   b. means connecting the outlet means of each of said plurality of vessels, except the last, to the inlet means of the next-succeeding vessel, the inlet means of the first of said vessels being the input of the series of vessels and the outlet means of the last of said vessels being the output of the series of vessels.

2. The apparatus defined in claim 1, wherein said means for heating includes a common means for heating separately each bottom portion of each of said plurality of vessels to the same temperature.

3. The apparatus of claim 2, wherein said means for heating further includes a common means for heating separately each top portion of each of said plurality of vessels to the same temperature.

4. The apparatus of claim 3, wherein said means for heating further includes means separately heating each side portion of each of said plurality of vessels to the same temperature.

* * * * *

UNITED STATES PATENT OFFICE
CERTIFICATE OF CORRECTION

Patent No. 3,630,686     Dated December 28, 1971

Inventor(s) Horst Rothert et al.

It is certified that error appears in the above-identified patent and that said Letters Patent are hereby corrected as shown below:

On the cover sheet, in the heading, insert -- [73] Assignee Karl Fischer Apparate- u. Rohrleitungsbau and Chatillon Societa Anonima Italiana per le Fibre Tessili Artificiali S.p.A. -- .

Signed and sealed this 14th day of November 1972.

(SEAL)
Attest:

EDWARD M. FLETCHER, JR.
Attesting Officer

ROBERT GOTTSCHALK
Commissioner of Patents